United States Patent
Raad

[19]

[11] Patent Number: 6,087,750
[45] Date of Patent: Jul. 11, 2000

[54] PERMANENT MAGNET GENERATOR

[75] Inventor: Bernard A. Raad, Oxnard, Calif.

[73] Assignee: Pacific Scientific Electro Kinetics Division, Santa Barbara, Calif.

[21] Appl. No.: 09/313,836

[22] Filed: May 18, 1999

[51] Int. Cl.[7] .................................................. H02K 21/00
[52] U.S. Cl. ........................ 310/152; 310/156; 310/112; 310/114; 310/104; 310/119; 310/268; 310/266; 310/259; 310/52; 310/87
[58] Field of Search ..................................... 310/152, 156, 310/112, 114, 104, 119, 268, 266, 259, 52, 87

[56] References Cited

U.S. PATENT DOCUMENTS

| | | | |
|---|---|---|---|
| 4,724,350 | 2/1988 | Shiraki et al. | 310/268 |
| 4,950,932 | 8/1990 | Harms et al. | 310/67 R |
| 5,396,140 | 3/1995 | Goldie et al. | 310/268 |
| 5,729,065 | 3/1998 | Fremery et al. | 310/90.5 |

Primary Examiner—Nestor Ramirez
Assistant Examiner—Thanh Lam
Attorney, Agent, or Firm—Trexler, Bushnell, Giangiorgi & Blackstone, Ltd.

[57] ABSTRACT

A permanent magnet generator is described. The generator includes a shaft which defines a longitudinal axis. A rotatable magnetic field assembly is mounted on the shaft and adapted for rotation about the shaft. The magnetic field assembly includes a plurality of axially magnetized magnets which are retained in a cavity about the shaft for generating an axial magnetic flux. A plurality of vanes are mounted on the magnetic field assembly housing for rotating the magnetic field assembly about the shaft when a fluid flows past the vanes. A stationary armature assembly is also located around the shaft in a position axially spaced from the magnetic field assembly. The armature assembly generates AC power when the magnetic field assembly is rotated. The stationary armature assembly includes an armature housing. An axial bore is formed through the armature housing for receiving the shaft. The armature housing defines a cavity about the axial bore in which a plurality of laminated bars are retained. A plurality of electrically conductive wires are wrapped around the laminated bars to form coils.

22 Claims, 5 Drawing Sheets

PERMANENT MAGNET GENERATOR

FIELD OF THE INVENTION

The present invention relates to electrical power generation and in particular to electrical power generation in applications that restrict diametrical space, such as oil exploration wells.

BACKGROUND TO THE INVENTION

Recent practices in oil exploration require that electric power be made available at the far end of an oil exploration well to power a variety of instruments that aid in navigating the drill head. Because the drill head could be up to five miles away from the surface, extendible power feeders have proven not only costly to operate, but also given to extremely high losses. Exploration companies and drill operators have therefore come to require that electric power be generated remotely at the end of the oil exploration well.

The typical remote power generation unit includes a turbine and an electrical generator which is coupled to the turbine via a transmission shaft. The turbine is positioned within the well in direct contact with the drilling fluid whereas the electrical generator is encased within a housing to isolate it from the drilling fluid. The turbine is caused to rotate by the drilling fluid flowing past it. The turbine imparts its rotational motion to the electrical generator via the transmission shaft. Specifically, the transmission shaft extends into the electrical generator housing to drive a rotor of the electrical generator. A seal is provided around the transmission shaft to prevent the ingress of drilling fluid into the generator housing.

The conventional remote power generation unit suffers from a number of disadvantages. A major disadvantage is that such units tend to fail prematurely. Premature failure results from leaks of drilling fluid into the generator housing. The drilling fluid, which is corrosive, causes the winding insulation in the armature to fail prematurely. Another disadvantage is the difficulty of scaling the housing effectively from the drilling fluid. The generators are usually run in an oil bath to provide a degree of temperature and pressure control. Accordingly, the pressure of the oil bath must be regulated to equalize it with that of the drilling fluid. The difficulty is also increased by the fact that the typical electrical generator used in these applications comprises a conventional concentrically arranged generator. In a conventional concentrically arranged generator, a cylindrical air gap must be maintained between rotor and stator. A complex pressure equalization device must therefore be employed to regulate the pressure differential between the two liquid media.

OBJECTS AND SUMMARY OF THE INVENTION

Accordingly, it is a general object of the present invention to provide a generator suitable for use in oil exploration with improved longevity and durability.

An additional object of the present invention is to provide a generator for oil exploration operations which obviates use of separate media, seals and a pressure equalization mechanism.

A further object of the present invention is to provide a generator capable of operation in contact with drilling fluid.

Yet another object of the present invention is to provide a generator capable of self-regulating its power output.

An additional object of the present invention is to provide a generator for oil exploration operations which is capable of increased power output.

Further objects and advantages will become apparent from the ensuing description.

Accordingly, the present invention provides a power generation unit including a shaft which defines a longitudinal axis and a rotatable magnetic field assembly mounted on the shaft. The magnetic field assembly is adapted for rotation about the shaft. The magnetic field assembly comprises a magnetic field assembly housing. A first axial bore is formed through the magnetic field assembly housing for receiving the shaft. The magnetic field assembly housing defines a first cavity about the bore in which a plurality of axially magnetized magnets are retained. A plurality of vanes are mounted on the magnetic field assembly housing for rotating the magnetic field assembly about the shaft when a fluid flows past the vanes. A stationary armature assembly is also located around the shaft in a position axially spaced from the magnetic field assembly for generating AC power when the magnetic field assembly is rotated. The stationary armature assembly includes an armature housing. A second axial bore is formed through the armature housing for receiving the shaft. The armature housing defines a second cavity about the second axial bore in which a plurality of laminated bars are retained. A plurality of electrically conductive wires are wrapped around the laminated bars to form coils.

BRIEF DESCRIPTION OF THE DRAWINGS

The present invention will now be described by way of example with reference to the accompanying drawings in which.

DETAILED DESCRIPTION OF A PREFERRED EMBODIMENT

Figure 1:
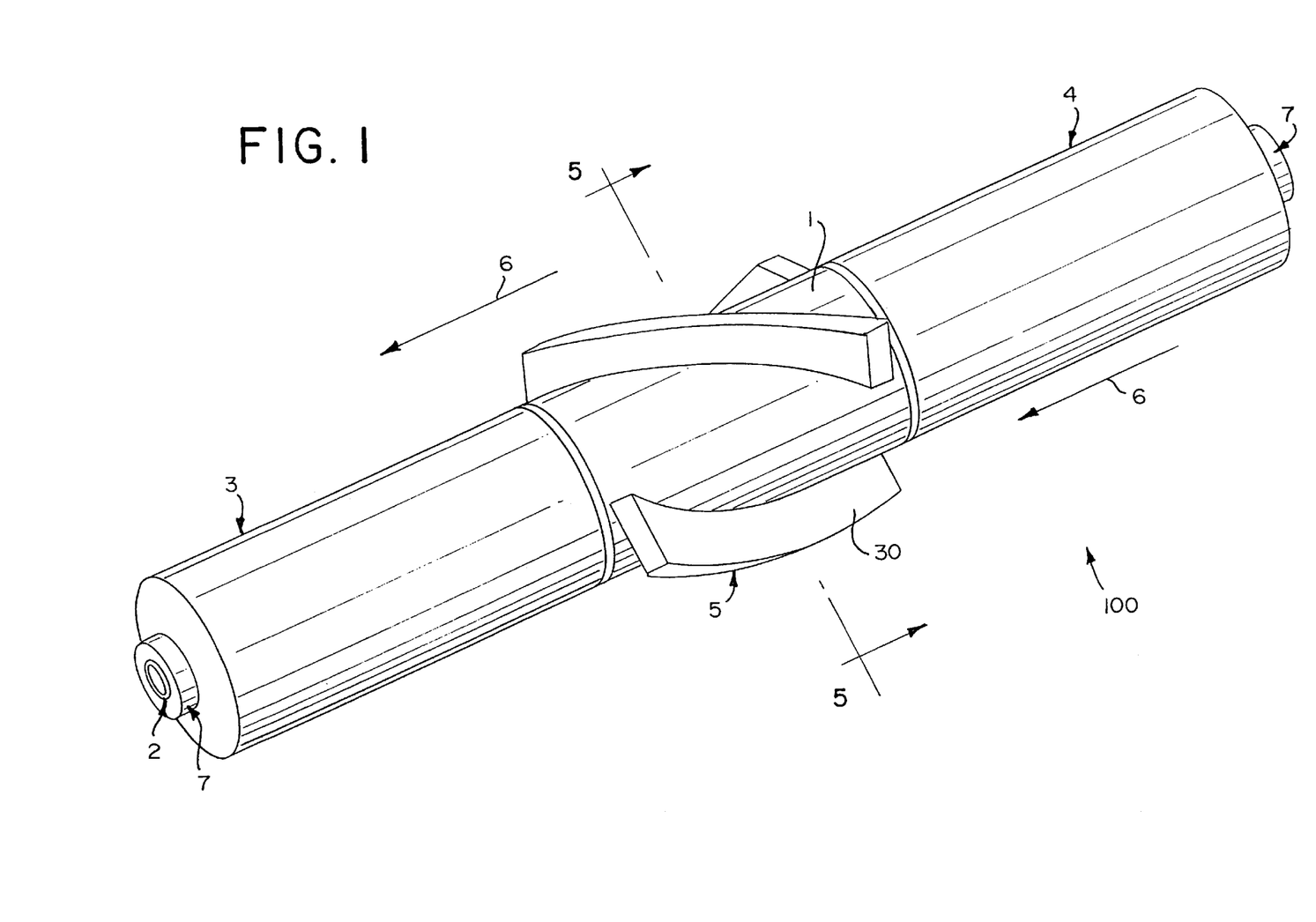
FIG. 1 is a perspective view of a permanent magnet generator according to the invention, in its preferred embodiment.

Reference is now invited to FIG. 1 which is a perspective view of a permanent magnet generator 100 according to the invention. As shown in FIG. 1, a permanent magnet generator 100 according to the invention includes a magnetic field assembly 1. The magnetic field assembly 1 is supported on a shaft 2, which runs through the magnetic field assembly 1. The magnetic field assembly 1 is adapted to rotate about the shaft 2 in direct contact with the external environment. For example, when the permanent magnet generator 100 is used in an oil exploration well, the magnetic field assembly 1 is adapted to rotate about the shaft 2 in direct contact with drilling fluid or "mud." The shaft 2 also runs through stationary armature assemblies 3, 4. The stationary armature assemblies 3, 4 are positioned on opposite sides of the magnetic field assembly 1 and are axially spaced therefrom. Accordingly, in the present invention, unlike existing in devices, an axial air gap is provided between the armature assemblies 3, 4 and the magnetic field assembly 1.

A permanent magnet generator 100 according to the invention also includes a turbine 5 and bearings 7. The turbine 5 surrounds the magnetic field assembly 1. Specifically, vanes 30 are positioned on the magnetic field assembly 1. The turbine 5 rotates the magnetic field assembly 1 when a fluid, e.g., drilling fluid, runs past the vanes 30. Fluid flow is illustrated schematically in FIG. 1 by the arrows 6. The bearings 7 are provided at either end of the shaft 2. The bearings 7 are also adapted to run in direct contact with drilling fluid or mud.

In another preferred embodiment of the present invention, no shaft 2 is used and no bores are provided through the armature assemblies 3, 4 for receiving the shaft. Instead, the bearings 7 are located directly on the turbine 5.

Now that the general construction of the present invention has been described, the components of the permanent magnet generator 100 will be considered in greater detail. First, the construction of the magnetic field assembly 1 will be examined. In this regard, attention is invited to FIGS. 1, 2, and 4.

Figures 2, 4, 5:
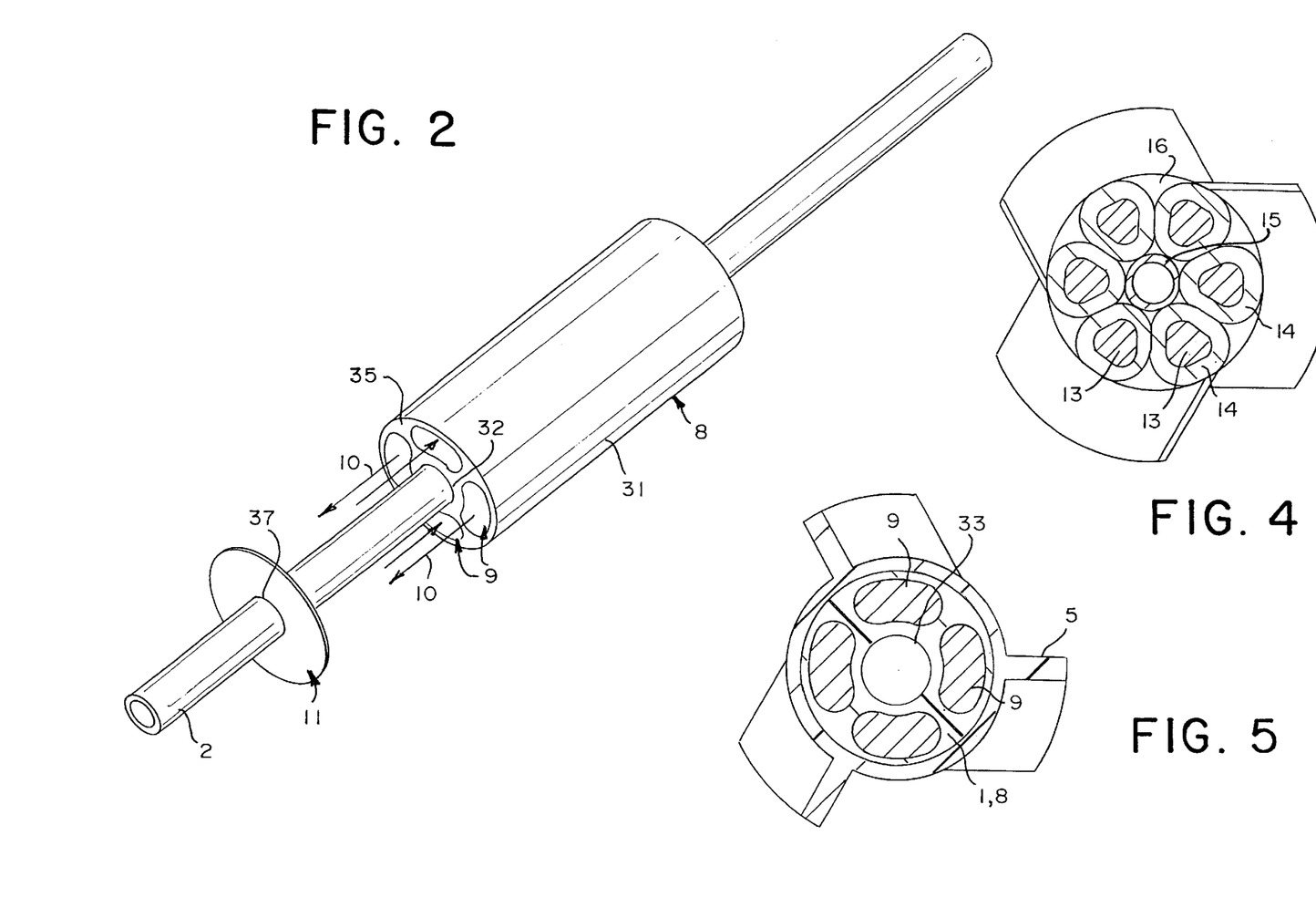
FIG. 2 is a perspective view of a magnetic field assembly according to the invention with a magnet cover removed to reveal the interior structure of the magnetic field assembly.
FIG. 4 is radial cross-section of the armature assembly.
FIG. 5 is a radial cross-section of the magnetic field assembly.

As illustrated in FIG. 2, in a preferred embodiment, the magnetic field assembly 1 is generally cylindrical. In this regard, the magnetic field assembly 1 includes a generally cylindrical magnetic field assembly housing or hub structure 8. The magnetic field assembly housing 8 includes an outer wall 31 and an inner wall 32. A cavity 35, preferably annular, is defined between the outer and inner walls 31, 32. The inner wall 32 defines an axial bore 33 which extends the length of the magnetic field assembly 1 and is positioned in a generally central region of the magnetic field assembly 1. The axial bore 33 is provided for receiving the shaft 2.

The magnetic field assembly 1 also includes a plurality of magnets 9. The magnets 9 are retained in the annular cavity 35. Preferably, the magnets 9 are positioned in spaced apart relation in an outer peripheral region of the annular cavity 35. The magnets 9 are magnetized axially to generate an axial magnetic flux 10, as indicated by the arrows in FIG. 2. In FIG. 2, four magnets 9 are shown. It will be understood by those skilled in the art, however, that a fewer or greater number of magnets could be used without departing from the invention. It will also be understood by those skilled in the art that the particular number of pairs of magnets 9 and the shape and length of the magnets 9 will depend on the particular application in which the permanent magnet generator 100 is used. For example, a greater number of magnets 9 could be used or the length of the magnets 9 could be extended to provide increased power output.

The magnetic field assembly 1 also includes a cover 11. The cover 11 is generally annular and includes a generally central aperture 37 adapted to receive the shaft 2. The cover 11 seals off the magnetic field assembly 1 from the external environment. Advantageously, when the permanent magnet generator 100 is used in an oil exploration well, the cover 11 and the housing 8 prevent intrusion of drilling fluid or mud into the annular cavity 35. Accordingly, the magnets 9 are protected from contamination by the drilling fluid or mud and the magnetic field assembly 1 may be operated in direct contact with the drilling fluid or "mud," as mentioned above. Because the magnetic field assembly 1 can be operated in direct contact with the "mud" the use of separate media, seals, and a pressure equalization mechanism is obviated. This in turn not only simplifies the structure of the generator 100, but increases its life since the seals and pressure equalization mechanisms used in current drilling operations are prone to failure.

It should be noted that if the magnetic field assembly 1 is to be operated in direct contact with the mud, it is preferred that the cover 11 and housing 8 be formed of corrosion resistant material. It is also preferred that the material from which the cover 11 and housing 8 is formed be able to withstand the high temperature and high vibration conditions present in an oil exploration well.

Attention will now be directed to the stationary armature assemblies 3, 4. In this regard, reference is invited to FIGS. 1, 3 and 4. At the outset, it should be noted that although two armature assemblies 3, 4 are shown, it is also within the scope of the invention to provide only a single armature assembly or a greater number of armature assemblies.

Figure 3:
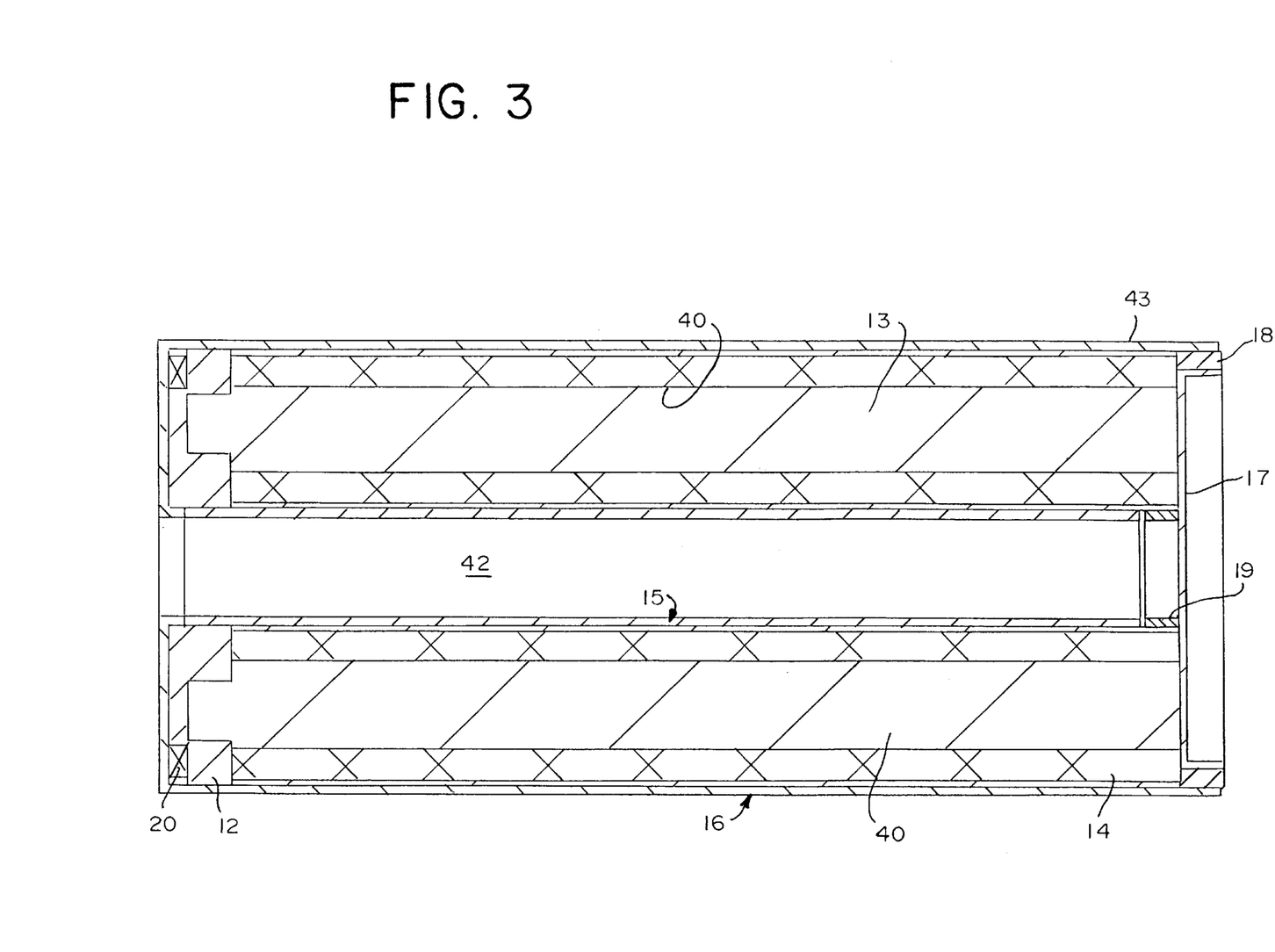
FIG. 3 is a longitudinal cross-section of an armature assembly according to the invention.

As illustrated, each of the armature assemblies 3, 4 is preferably generally cylindrical and supported on the shaft 2. Each of the armature assemblies 3, 4 includes a generally cylindrical armature housing 16. The housing 16 includes an inner wall 15. A, preferably, annular cavity 40 is defined between the outer housing 16 and the inner wall 15. The inner wall defines an axial bore 42, which is preferably positioned in a generally central region of an armature assembly 3 or 4. The axial bore 42 extends the length of an armature assembly 3 or 4 and receives the shaft 2.

Each of the armature assemblies 3, 4 also includes an armature yoke 12. Each armature yoke 12 is retained at one end of the housing 16 within the annular cavity 40. Each armature yoke 12 supports a plurality of laminated bars 13. The laminated bars 13 are analogous to "teeth." Conductive wires are wound around the bars 13 or "teeth" to form coils 14. The conductive coils 14 produce AC voltage when the magnetic field assembly 1 is rotated. The amplitude of the voltage depends on the load imposed on the permanent magnet generator 100 and the speed of rotation of the magnetic field assembly 1. The frequency of the voltage depends on the speed of rotation of the magnetic field assembly 1 and the number of magnetic poles retained within the magnetic field assembly 1. As mentioned above, the number of magnetic poles can be varied in accordance with the particular application in which the permanent magnet generator 100 can be used. The speed of rotation of the magnetic field assembly 1 will vary with the speed of the fluid flowing past the permanent magnet generator 100.

Advantageously, the positioning of the coils 14 of conductive wire mean that even the leakage flux is used to generate voltage. Specifically, in operation flux leaks from "tooth" to "tooth." In prior art devices, this flux simply leaked away and was wasted. In the present invention, however, the conductive coils 14 are wrapped directly around the laminated bars or "teeth" and so even the leakage flux excites the coils 14 and is used to generate voltage.

A non-magnetic faceplate 17 also forms part of each of the armature assemblies 3, 4. The non-magnetic face plate 17 is coupled to an end of each of the armature assemblies 3, 4. Specifically, each non-magnetic face plate 17 is connected to an armature assembly 3, 4 by a pair of non-conductive rings 18, 19. The non-conductive ring 18 separates the face plate 17 from an outer wall 43 of the housing 16; i.e, it is positioned between the outer wall 43 and the face plate 17. The non-conductive ring 19 separates the face plate 17 from the interior wall 15 of the housing 16. The rings 18, 19 are provided to limit the eddy currents generated in the stationary face plate 17 by the rotating magnetic field assembly 1.

Each of the armature assemblies 3, 4 is filled completely with a potting compound. Specifically, the annular cavity 40 is filled with potting compound to fill completely any gaps between the armature components. The potting compound has a coefficient of thermal expansion which closely matches that of the other armature components.

The armature assemblies 3, 4 of the present invention provide several advantages over existing devices. For example, the armature housings 16 of the present invention, unlike those of existing devices, seal the armature components substantially completely from the external environment. Such sealing is possible because no access need be provided into the interior of the armature housing 16 to drive the generator 100. It will be recalled that in prior art devices access into the generator housing had to be provided so that the transmission shaft could drive the rotor. The axial arrangement of the present invention however makes such access, i.e., such an opening, unnecessary. Accordingly, in the armatures 3, 4 of the present invention, protection is achieved without a complex sealing mechanism. A further advantage results from the use of the potting compound to fill the armature assemblies 3, 4. Specifically, the low compressivity of the potting compound means that the armature assemblies may be operated in direct contact with the drilling fluid without the use of complex seals and pressure equalization mechanisms.

Figure 6:
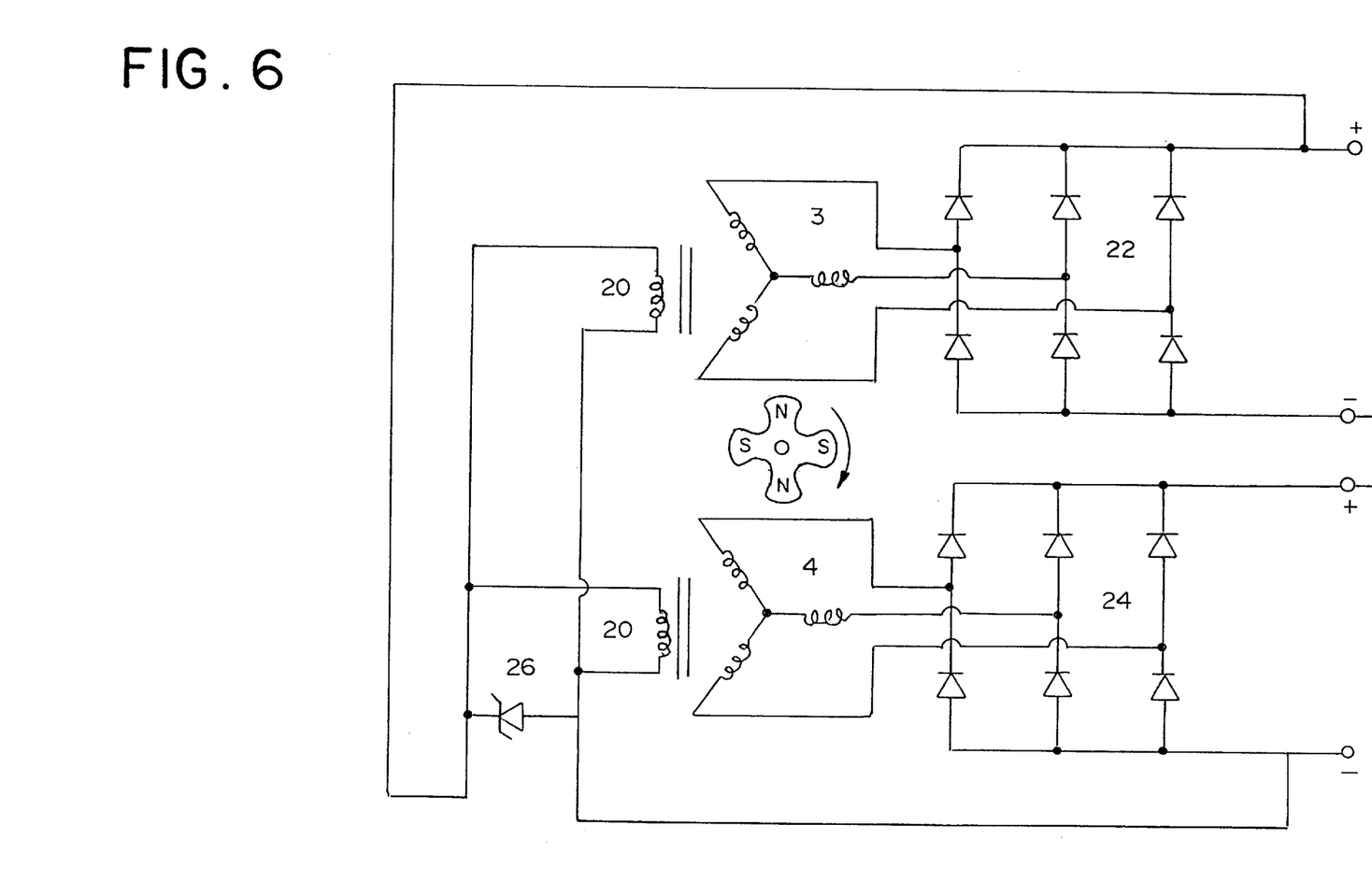
FIG. 6 is a diagrammatic electrical schematic of an armature assembly including rectifiers and a regulation coil used in the present invention.
Figure 7:
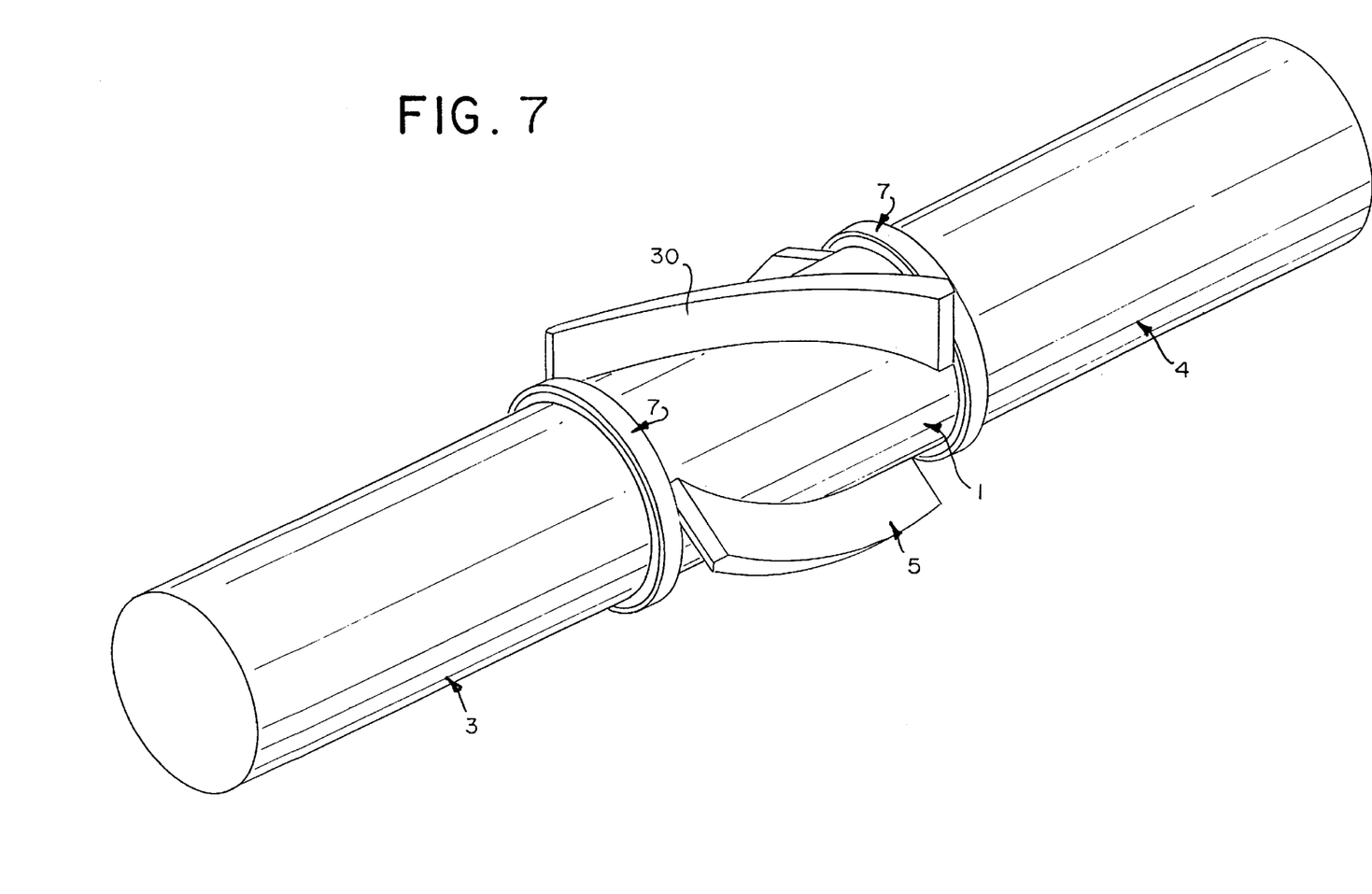
FIG. 7 is a perspective view of an alternative embodiment of a permanent magnet generator according to the invention.

As shown in FIG. 6, each of the armature assemblies 3, 4 preferably comprises a three-phase armature. It will be apparent to those skilled in the art, however, that a larger or fewer number of phases could be produced without departing from the spirit of the invention. It is also preferred that the armature assembly 3 be coupled to a bank of rectifiers 22 and that the armature assembly 4 be coupled to a bank of rectifiers 24. The rectifiers 22, 24 convert respectively the AC power produced by the armatures 3, 4 into DC power, suitable, e.g., for powering a variety of instruments that aid in navigating the drill head. The rectifiers 22, 24 may be connected in series or in parallel according to the required level of voltage. In the embodiment shown in FIG. 6, the armatures 3, 4 are shown connected in series.

A regulation coil 20 may also be connected in parallel with the DC power output of the armatures 3, 4 and may derive its power from it. As shown in FIG. 3, a regulation coil 20 is provided at one end of each of the armature assemblies 3, 4. The regulation coil 20 ensures that the output voltage of the permanent magnet generator 100 falls within a predetermined range. The regulation coil 20 regulates the output voltage in two ways. First, the regulation coil 20 acts by saturating the iron core of each armature 3, 4 with DC flux, whenever the output voltage exceeds a preselected limit, due to variations in load and speed. Specifically, when the output voltage exceeds the preselected limit, the regulation coil 20 saturates the iron core of an armature 3, 4 with a flux which is opposed to that of the magnetic field assembly 1. Because the armature core is saturated with flux from the regulation coil 20, flux from the magnetic field 1 assembly cannot occupy the armature core and voltage cannot be generated. As the flux from the regulation coil dissipates, the amount of flux from magnetic field assembly 1 present within the armature core will increase and hence the amount of flux available for generation will increase. Thus, the regulation coil 20 gradually increases leakage of the flux available for generation. Secondly, the regulation coil 20 also regulates the output voltage by acting as an added load on the main power output of the permanent magnet generator 100. As stated above, the regulation coil may derive its power from the DC power output of the permanent magnet generator 100. Accordingly, the regulation coil 20, provides a degree of resistive control over the output voltage.

As shown in FIG. 6, a reference Zener diode 26 may also be provided. The reference Zener diode 26 ensures that the regulation coils 20 do not enter into operation until some predetermined voltage has been reached. It will be apparent to those skilled in the art that although only a single Zener diode 26 is shown in FIG. 6, it is also within the scope of the invention to provide several Zener diodes 26, with each Zener diode 26 avalanching at a different voltage level. By connecting several Zener diodes 26, with each Zener diode 26 avalanching at a different voltage level, "stepped" regulation is provided over a wide range of loads and speeds.

FIG. 4 shows an arrangement of the armatures 3, 4 in series. Because the voltage of the armatures 3, 4 is added further regulation is enabled on machines with a wide speed range by disconnecting one of the armatures 3, 4 from the circuit. That is, by disconnecting one of the armatures 3, 4, a change in speed will be reflected in a smaller change in voltage. Hence, the regulation coils 20 will be responsive to smaller changes in voltage. Nevertheless, parallel connection of the armatures 3, 4 is also possible when increased current is needed.

Thus, the permanent magnet generator 100 of the present invention is provided with an automatic, negative feedback regulation scheme/circuit. The arrangement of the circuit allows the permanent magnet generator 100 to self-regulate its output voltage. This provides a distinct advantage over prior art generators in which no regulation schemes were provided, thereby leaving the equipment to which the generators were coupled susceptible to power surges. This in turn decreased the reliability and longevity of the equipment to which the prior art generators were coupled. Provision of a self regulation scheme also provides a distinct advantage when the permanent magnet generator 100 of the present invention is used in an oil exploration well. In an oil exploration well, space is at a premium. The use of a self-regulation scheme obviates use of a separate control device and so regulation can be provided without increasing the space requirements of the generator unit.

The operation of the present invention will now be briefly described. The description of the operation will be made with reference to an oil exploration well. It will be understood by those skilled in the art that the present invention could be used in other applications.

The permanent magnet generator 100 is arranged axially within an oil exploration well. As drilling fluid flows down the well, and past the generator 100, it impacts the vanes 30 and causes the turbine 5 to rotate. The turbine 5 is connected to the magnetic field assembly 1 and so as the turbine 5 rotates, the magnetic field assembly 1 also rotates. Rotation of the magnetic field assembly 1 produces an axial magnetic flux 10. Leakage flux is also generated which leaks from "tooth" to "tooth" of the armature assemblies 3, 4. Both the axial magnetic flux and the leakage flux induce current 10 in the windings or coils of conductive wire 14 in the armature assemblies 3, 4. The induced AC current is rectified by the rectifiers 22, 24 to produce DC power. The DC power output will vary as the rate of rotation of the magnetic field assembly 1 changes and as the load imposed on the generator 100 changes. The rate of rotation will vary with the speed of the drilling fluid flowing past the generator 100. The load will vary as the power requirements of the equipment to which the generator 100 is coupled changes with time. The regulation coil 20, in each armature assembly 3, 4, however, regulates the DC power output to ensure the output voltage falls within a predetermined range. If the output voltage exceeds a preselected limit, the regulation coil saturates the armature core with DC flux to regulate the voltage down. The regulation coil 20 also provides a degree of resistive control over the output voltage since the regulation coil 20 acts as an added load on the permanent magnet generator 100.

Thus, an improved permanent magnet generator 100 has been described. The permanent magnet generator 100 of the present invention is arranged with an axial air gap and so is particularly suited for applications that restrict diametrical space, such as encountered in oil exploration wells. Provision of the axial air gap means that the entire available diameter both for the field and the armature can be taken advantage of. The permanent magnet generator 100 of the present invention includes a preferably cylindrical rotating magnetic field assembly 1, magnetized axially, and rotating next to one or two armature assemblies 3, 4 that are also preferably cylindrical. The assemblies 3, 4 are potted and sealed completely to allow operation in direct contact with the drilling fluid or mud. Accordingly, the need in prior art devices for a separate media, seals and a pressure equalization mechanism is eliminated. This simplifies the structure of the permanent magnet generator 100, reduces its production cost and markedly increases its reliability. Moreover, the permanent magnet generator 100 of the present invention is provided with an armature saturating coil 20, which allows the permanent generator 100 to self-regulate its output voltage over a wide range of loads and speeds. Thus, sharp rises in output voltage are avoided, which can lead to equipment failure.

I claim:

1. A power generation unit comprising:

a shaft defining a longitudinal axis;

a rotatable magnetic field assembly mounted on said shaft and adapted for rotation about said shaft, said magnetic field assembly comprising a magnetic field assembly housing, a first axial bore being formed through the magnetic field assembly housing for receiving said shaft, said magnetic field assembly housing defining a first cavity about the bore in which a plurality of axially magnetized magnets are retained;

a plurality of vanes mounted on said magnetic field assembly housing for rotating said magnetic field assembly about said shaft when a fluid flows past said vanes;

a stationary armature assembly located around said shaft in a position axially spaced from said magnetic field assembly for generating AC power when said magnetic field assembly is rotated, said stationary armature assembly including an armature housing, a second axial bore being formed through the armature housing for receiving said shaft, said armature housing defining a second cavity about said second axial bore in which a plurality of laminated bars are retained, a plurality of electrically conductive wires being wrapped around the laminated bars to form coils.

2. A power generation unit according to claim 1 in which said magnetic field assembly and said stationary armature assembly are generally cylindrical.

3. A power generation unit for a downhole drilling operation comprising:

a shaft defining a longitudinal axis;

a rotatable magnetic field assembly mounted on the shaft and adapted for rotation about the shaft in contact with drilling fluid, said rotatable magnetic field assembly including a magnetic field assembly housing, a first axial bore being formed through the magnetic field assembly housing for receiving the shaft, said magnetic field assembly housing defining a first cavity about said axial bore, the first cavity being completely sealed from the drilling fluid and retaining a plurality of axially magnetized magnets for generating an axial magnetic flux;

a plurality of vanes positioned on said magnetic field assembly housing for rotating said magnetic field assembly when drilling fluid flows past the vanes;

a stationary armature assembly for producing AC power when said magnetic field assembly is rotated, said armature assembly being located around the shaft in a position axially spaced from the magnetic field assembly and being adapted for contact with the drilling fluid, said stationary armature assembly including an armature housing, a second axial bore being formed through the armature housing for receiving said shaft, said armature housing defining a second cavity about said second axial bore, said second cavity being sealed from said drilling fluid and being filled with a potting compound, said second cavity retaining a plurality of laminated metal bars, a plurality of electrically conductive wires being wrapped around the laminated bars to form coils.

4. A power generation unit for a downhole drilling operation according to claim 3 in which said magnetic field assembly and said armature assembly are generally cylindrical.

5. A power generation unit for a downhole drilling operation according to claim 4 in which said first cavity and said second cavity are generally annular.

6. A power generation unit for a downhole drilling operation comprising:

a shaft defining a longitudinal axis;

a rotatable magnetic field assembly mounted on the shaft and adapted for rotation about the shaft in contact with the drilling fluid, said rotatable magnetic field assembly including a magnetic field assembly housing, a first axial bore being formed through the housing for receiving the shaft, said magnetic field assembly housing defining a first cavity about said axial bore, said first cavity being sealed from the drilling fluid, the annular cavity retaining a plurality of axially magnetized magnets for generating an axial magnetic flux;

a plurality of vanes positioned on said magnetic field assembly housing for rotating said magnetic field assembly when drilling fluid flows past the vanes;

first and second stationary armature assemblies located around the shaft for producing AC power when said magnetic field assembly is rotated, said first armature assembly being axially spaced from the magnetic field assembly and being positioned on a first side of said magnetic field assembly, said second armature assembly being axially spaced from the magnetic field assembly and being positioned on a second opposite side of said magnetic field assembly, each of said armature assemblies being axially spaced from the magnetic field assembly and being adapted for contact with the drilling fluid, each armature assembly comprising an armature housing through which a second axial bore being is formed for receiving said shaft, each armature housing defining a second cavity about said second axial bore, each second cavity being sealed from said drilling fluid and being filled with a potting compound, each second cavity retaining a plurality of laminated metal bars, a plurality of electrically conductive wires being wrapped around the laminated bars to form coils.

7. A power generation unit for a downhole drilling operation according to claim 6 in which said magnetic field assembly and said first and second stationary armature assemblies are generally cylindrical.

8. A power generation unit for a downhole drilling operation according to claim 7 in which said first cavity and each of said second cavities are generally annular.

9. A power generation unit according to claim 6 further comprising first and second bearings, said first bearing being attached to a first end of the shaft, said second bearing being attached to a second opposite end of the shaft, said first and second bearings being adapted to operate in contact with the drilling fluid.

10. A power generation unit according to claim 6 in which each of said armature housings comprises a generally cylindrical exterior wall and a generally cylindrical interior wall spaced from the exterior wall, said generally cylindrical interior wall defining said second axial bore in which said shaft is received.

11. A power generation unit according to claim 10 in which each of said armature assemblies include a non-conductive face plate coupled to one end of the armature assembly, the non-conductive plate being attached to first and second non-conductive rings, said first non-conductive ring separating said non-conductive face plate from said exterior wall and said second non-conductive ring separating said non-conductive face plate from said interior wall.

12. A power generation unit according to claim 6 in which the potting compound has a coefficient of thermal expansion substantially equal to that of the laminated bars and conductive coils.

13. A power generation unit according to claim 6 in which each armature assembly includes a laminated yoke retained at one end of the armature housing, said laminated yoke supporting said laminated bars.

14. A power generation unit according to claim 6 further comprising first and second rectifier assemblies, said first rectifier assembly being coupled to said first armature assembly for converting the AC power produced by the first armature assembly into DC power, said second rectifier assembly being coupled to said second armature assembly for converting AC power produced by said second armature assembly into DC power.

15. A power generation unit according to claim 14 in which said first and second rectifier assemblies are connected in parallel.

16. A power generation unit according to claim 14 in which said first and second rectifier assemblies are connected in series.

17. A power generation unit according to claim 14 further comprising a first regulation coil coupled to the first armature assembly and a second regulation coil coupled to said second armature assembly for ensuring that the DC power produced by said first and second armature assemblies falls within a predetermined range.

18. A power generation unit according to claim 17 in which said first regulation coil is connected in parallel with a DC power output of said first armature assembly and said second regulation coil is connected in parallel with a DC power output of said second armature assembly.

19. A power generation unit according to claim 17 further comprising a reference Zener diode coupled to said regulation coils for ensuring that the regulation coils operate only after a predetermined voltage level has been reached.

20. A power generation unit according to claim 17 further comprising a plurality of reference Zener diode coupled to said regulation coils, each of said Zener diodes avalanching at a different predetermined voltage level, for regulating the operation of the permanent magnet generator.

21. A power generation unit comprising:
a rotatable magnetic field assembly for generating an axial magnetic flux, said rotatable magnetic field assembly including a magnetic field assembly housing, said magnetic field assembly housing defining a cavity in which a plurality of axially magnetized magnets are retained;
a plurality of vanes mounted on said magnetic field assembly housing for rotating said magnetic field assembly when a fluid flows past said vanes;
a stationary armature assembly positioned adjacent and axially spaced from said magnetic field assembly for generating AC power when said magnetic field assembly is rotated, said stationary armature assembly including an armature housing, said armature housing defining a second cavity in which a plurality of laminated bars are retained, a plurality of electrically conductive wires being wrapped around the laminated bars to form coils; and
a bearing attached to said magnetic field assembly, connecting said magnetic field assembly to said armature assembly.

22. A power generation unit for a downhole drilling operation comprising:
a rotatable magnetic field assembly adapted for rotation about the shaft in contact with drilling fluid, said rotatable magnetic field assembly including a magnetic field assembly housing defining a first cavity, said first cavity being completely sealed from the drilling fluid and retaining a plurality of axially magnetized magnets for generating an axial magnetic flux;
a plurality of vanes positioned on said magnetic field assembly housing for rotating said magnetic field assembly when drilling fluid flows past the vanes;
a stationary armature assembly for producing AC power when said magnetic field assembly is rotated, said armature assembly being positioned adjacent and axially spaced from the magnetic field assembly and being adapted for contact with the drilling fluid, said stationary armature assembly including an armature housing, defining a second cavity, said second cavity being sealed from said drilling fluid and being filled with a potting compound, said second cavity retaining a plurality of laminated metal bars, a plurality of electrically conductive wires being wrapped around the laminated bars to form coils; and
a bearing attached to said magnetic field assembly, connecting said magnetic field assembly to said armature assembly.

* * * * *